Patented July 3, 1934

1,964,875

UNITED STATES PATENT OFFICE 1,964,875

METHOD OF REMOVING IMPURITIES FROM OILS AND FATS

Arnold Freiburg, Harburg-Wilhelmsburg, Germany, assignor to the firm of Harburger Ölwerke Brinckman & Mergell, Harburg-Wilhelmsburg, Germany No Drawing. Application August 5, 1932, Serial No. 627,606. In Germany May 2, 1931

2 Claims. (Cl. 87—12)

Oils and fats contain generally a series of impurities which come from the crude oil or from the extraction. To this category belong mucin, phosphatides, such as lecithin, lecithin albumens, carbohydrates, fragments of fabric and the like. These materials are mostly removed before the refining process proper. For this purpose a whole series of methods are known, for example washing with alcohol acetone on the countercurrent principle, coagulating with media such as tannin, alum and so on and precipitating and washing with water. Finally it is also known to destroy the albumen and mucin by concentrated acids such as phosphoric acid, hydrochloric acid, sulphuric acid, either alone or in conjunction with materials which absorb the attacked material such as carbon, bleaching earths and the like.

These methods, however, have quite noticeable technical disadvantages. In particular, the acid methods, if filtration is not effected, are too slow as the settling and repeated washing for the purpose of removing the acids takes a considerable time. Filtration, however, presents considerable difficulties. Firstly, the water content of the crude oil or of the acids used is a disturbing factor. Secondly, the china clay or absorption material are cemented together so that the filtration takes a very long time. Finally, the filter cloths and apparatus are quite strongly attacked by the mineral acids.

It has now been found that these disadvantages can be avoided if a combination of phosphoric acid and cellulose is employed for removal of the said foreign bodies from the oil. These materials may be added either simultaneously or in succession to the oils to be treated. Moreover, the cellulose may be first treated with the necessary quantity of acid and the mass produced in this manner used for the process.

The mucin and the like attacked by the acid are then in known manner absorbed by addition of bleaching earth, kieselguhr or other inorganic adsorption medium. As cellulose, however, binds the water content of the acid and of the crude oil to be treated the cementing together of the absorption media is avoided. In this manner very simple and easy filtration is facilitated.

By the addition of large quantities of bleaching earth also good bleaching effects are simultaneously obtained.

If suitable quantities of cellulose are used the acid which is suspended in the oil can be neutralized after removal of the mucin with aqueous alkalies. Neutralization, however, can be effected with solid neutralizing media such as ammonium carbonate, chalk, baryta, and the like. Neutralization with gases, for example with ammonia, can also be carried out.

Example 100 parts by weight of oil are mixed at room temperature according to the source and quality of the oil with 0.1 to 0.8% phosphoric acid (specific gravity 1.55) and stirred during mixing. During the stirring the temperature is brought slowly to 70° C. Then according to the nature of the oil about 1% of kieselguhr, fuller's earth, or bentonite, and 0.1 to 0.5% of cellulose are introduced. It is advantageous to prepare the cellulose with the necessary quantity of phosphoric acid separately into a soup and then add it. While maintaining the temperature at 70° C. the mixture is allowed to act for half an hour, and then technically pure chalk is added to the extent of about one and a half times the quantity of phosphoric acid. After a further half hour the mixture of oil, earth, cellulose and phosphates is filtered.

Compared with previously known methods, the method of the present invention offers a series of important technical advantages, viz:

1. The total time of treatment is reduced compared with the washing method by more than half.
2. A neutralization of the mineral acids used by aqueous methods is possible.
3. Easy treatment of the filter residues by extraction is possible so that no neutral oil is lost.
4. The emulsion losses of the washing method are avoided.
5. Treatment with aqueous mineral acids is facilitated.
6. Due to the shortening of the process, in particular the avoidance of settling, the apparatus used is considerably protected from the action of mineral acids.
7. The method permits neutralization directly after removal of the mucin.

It is already known to use mixtures of cellulose and acids for bleaching oils. Compared with this known method the combination of phosphoric acid and cellulose presents particular technical advantages because vegetable oils are sensitive to the usual mineral acids such as sulphuric acid, hydrochloric acid, nitric acid. Phosphoric acid permits satisfactory treatment without special washing or intensive subsequent neutralization. In addition phosphoric acid, although it is a strong acid, does not attack cellulose. Moreover, any unfavourable action on metal by the method used is avoided.

I claim:—

1. A method of removing impurities from oils and fats which comprises subjecting the oils or fats to be purified to the action of small quantities of concentrated phosphoric acid and heating the mixture slowly to about 70° C. while stirring it intimately, thereafter introducing a small quantity of cellulose, leaving the mixture to the action of the phosphoric acid and the cellulose and filtering.

2. A method of removing impurities from oils and fats which comprises subjecting the oils or fats to the action of small quantities of a mixture of phosphoric acid and cellulose heating the mixture to about 70° C., neutralizing the acid by adding chalk and filtering.

ARNOLD FREIBURG.